United States Patent [19]
Krauter et al.

[11] Patent Number: 6,053,682
[45] Date of Patent: *Apr. 25, 2000

[54] FASTENING SCREW WITH A BEVEL AND DEFORMABLE COATING FOR SECURING A BODY PLACE

[75] Inventors: Michael Krauter; James J. Lundy, Jr., both of Charleston, S.C.

[73] Assignee: Robert Bosch GmbH, Stuttgart, Germany

[ * ] Notice: This patent issued on a continued prosecution application filed under 37 CFR 1.53(d), and is subject to the twenty year patent term provisions of 35 U.S.C. 154(a)(2).

[21] Appl. No.: 08/966,384

[22] Filed: Nov. 7, 1997

[30] Foreign Application Priority Data

Nov. 7, 1996 [DE] Germany ............... 196 45 886

[51] Int. Cl.$^7$ ................................ F16B 33/00
[52] U.S. Cl. ................ 411/369; 411/542; 411/399
[58] Field of Search ................ 411/369, 370, 411/542, 541, 907, 908, 914, 10, 11, 399

[56] References Cited

U.S. PATENT DOCUMENTS

| | | | |
|---|---|---|---|
| Re. 27,085 | 3/1971 | Weidner | 411/369 |
| 2,030,088 | 2/1936 | Young | 411/369 |
| 2,751,806 | 6/1956 | Dickie | 411/542 |
| 2,995,057 | 8/1961 | Nenzell | 411/399 |
| 3,247,752 | 4/1966 | Greenleaf | 411/542 |
| 3,272,952 | 9/1966 | McKeon | 411/542 |
| 3,298,270 | 1/1967 | Launay | 411/542 |
| 3,711,347 | 1/1973 | Wagner et al. | |
| 3,788,185 | 1/1974 | Gutshall | |
| 3,882,752 | 5/1975 | Gutshall | |
| 3,933,358 | 1/1976 | Hoer | |
| 5,622,464 | 4/1997 | Dill | 411/369 |

FOREIGN PATENT DOCUMENTS

| | | | |
|---|---|---|---|
| 2170106 | 9/1973 | France | |
| 1 861 352 | 12/1969 | Germany | |
| 2013 968 | 3/1970 | Germany | |
| 152377 | 3/1957 | United Kingdom | 411/369 |
| 1 300 449 | 12/1972 | United Kingdom | |

*Primary Examiner*—Flemming Saether
*Attorney, Agent, or Firm*—Ronald E. Greigg; Edwin E. Greigg

[57] ABSTRACT

A fastening screw is used to hold a hollow body against a base body. To assure that no dirt can get into the hollow body, sealing between the fastening screw and the hollow body is necessary. The fastening screw has a bevel (10s) coated with a relatively soft coating at the transition between the screw shaft and the screw head. When the fastening screw is tightened, one edge of the hollow body digs into the coating, thus assuring a secure seal. The fastening screw is intended in particular in a brake system for securing a motor housing to a pump housing.

9 Claims, 2 Drawing Sheets

FASTENING SCREW WITH A BEVEL AND DEFORMABLE COATING FOR SECURING A BODY PLACE

BACKGROUND OF THE INVENTION

The invention is based on a fastening screw and a screw connection with a fastening screw, as well as a method for fastening a body by use of a screw.

In screw connections, many different possibilities of sealing are known between the head of the fastening screw and the opening in the screw through which the screw shaft of the fastening screw is passed.

For instance, it is known to insert a sealing washer for sealing purposes between the retaining face of the screw head and the bearing face of the body to be screwed. To enable the sealing washer to seal properly, the fastening screw must be tightened with a minimum torque. If the fastening screw of the screw connection holds a hollow body against a base body, then the fastening screw cannot be tightened with an arbitrarily high torque, since this would cause excessive deformation of the hollow body. The result of this would be that the fastening screw can be tightened only relatively weakly, so that the minimum torque required for the sealing action is hardly achieved. A further factor is that tightening of the fastening screw, even at a relatively low torque, cannot completely preclude a certain deformation of the hollow body, which can lead to an impairment of the seal between the hollow body and the head of the fastening screw when there is a sealing disk. Another disadvantage of the known screw connection is that after the fastening screw is tightened, settling in the region of the sealing disk between the head of the screw and the bearing face on the hollow body lessens the prestressing in the shaft of the fastening screw somewhat, and as a result the fastening screw is no longer properly tightened, and there is accordingly a risk that the fastening screw will become loose or come undone entirely. Another disadvantage is that the bearing face for the sealing disk on the hollow body must be rather smooth and flat, which increases the effort and expense for manufacturing the body.

OBJECT AND SUMMARY OF THE INVENTION

The fastening screw according to the invention, the screw connection with the fastening screw, and the method defined herein have the advantage over the prior art that even if the fastening screw is tightened with relatively low torque, excellent sealing action is attainable between the screw head and the screw opening on the body through which the screw shaft of the fastening screw protrudes. Another advantage is that even if the bearing face for the screw head of the fastening screw is relatively rough and uneven, good sealing action is attainable. It is also highly advantageous that the body or hollow body is permanently connected to the base body even if there is vibrational stress, and the sealing action is durably preserved. Another advantage is that the fastening screw can be tightened with a torque such that metal to metal contact between the screw head and the bearing face of the body takes place, and the unscrewing moment and the loosening torque of the fastening screw are unaffected by the seal. As a result, the prestressing in the screw shaft advantageously remains independent of the sealing between the screw head and the body. Another advantage is that even if the screw opening is relatively significantly nonround, good sealing is attained.

The invention will be better understood and further objects and advantages thereof will become more apparent from the ensuing detailed description of preferred embodiments taken in conjunction with the drawings.

DESCRIPTION OF THE PREFERRED EMBODIMENTS

The fastening screw embodied according to the invention, and screw connection with the fastening screw, are suitable for holding various bodies, especially hollow bodies, on various base bodies; to simplify the ensuing description, an exemplary embodiment has been selected by preference in which the body is a motor housing surrounding an electric motor, and the base body is a pump housing containing a pump, the pump being driven by the electric motor. The fastening screw or the screw connection with the fastening screw is especially suitable if the pump and the electric motor form a pumping unit of a hydraulic slip-controlled brake system and are preferably used to return brake fluid from the fluid brake cylinders to the master cylinder of the brake system.

Figure 1:
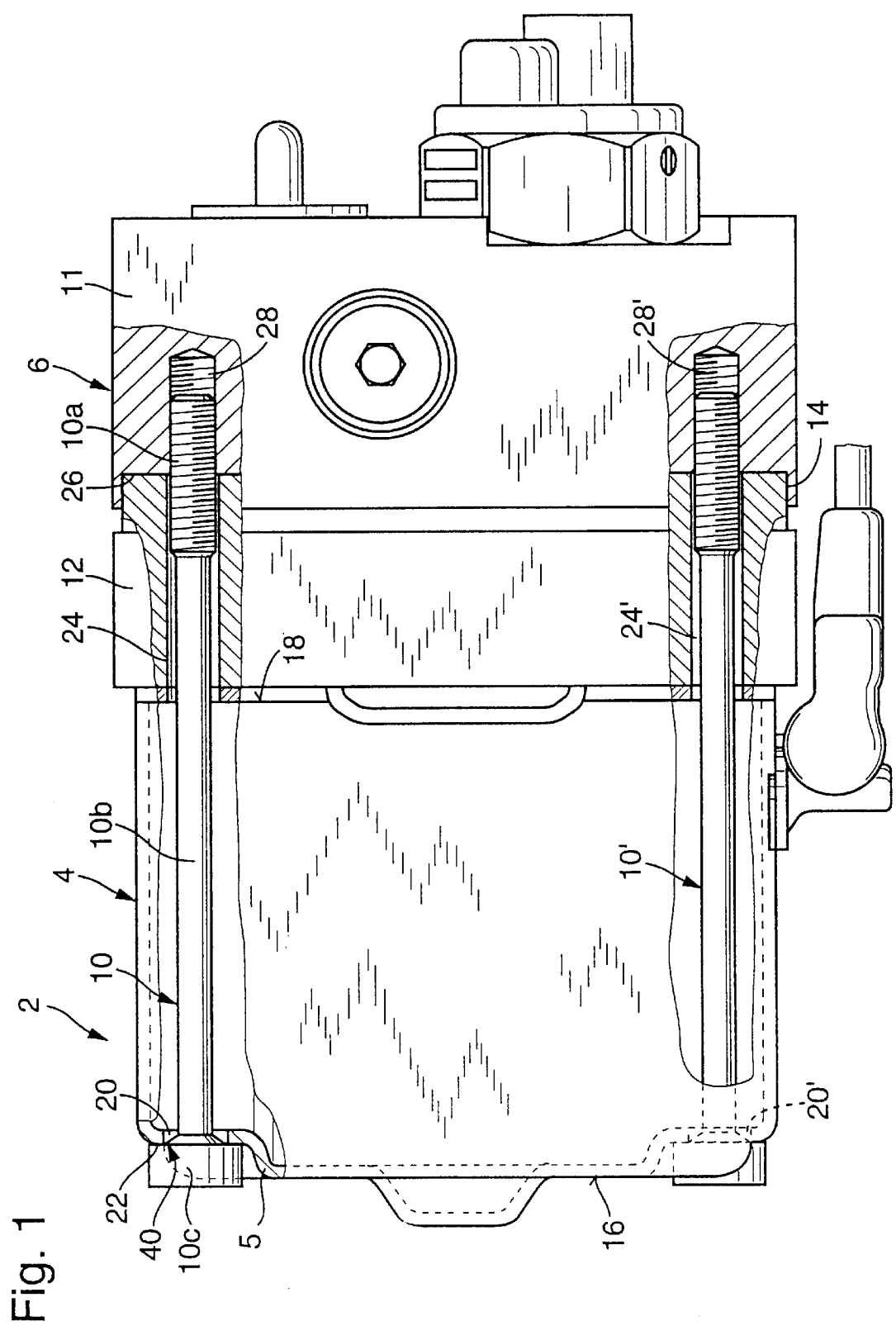
FIG. 1 shows a screw connection with a fastening screw for holding a body, embodied in the form of a motor housing, on a pump housing as a body.

FIG. 1 shows a preferably selected, especially advantageous exemplary embodiment of a screw connection 2 between a motor housing 4 and a pump housing 6. The motor housing 4 is a hollow body, and the pump housing 6 acts as the base body. The screw connection 2 includes a fastening screw 10. The fastening screw 10 holds the motor housing 4 against the pump housing 6. The motor housing 4 is a fastening body, or considered in general terms a body, and the pump housing 6 can be called a base body. The fastening screw 10 holds the at least two bodies, that is, the body or fastenings body or hollow body on the one hand and the base body on the other, together. In the exemplary embodiment shown, the pump housing 6 substantially comprises a first pump housing part 11 and a second pump housing part 12. The motor housing 4 is flanged to the pump housing part 12 of the pump housing 6. The pump in the pump housing 6 is a gear pump, for example. By way of example, the pump has gear wheels that are made to rotate by the electric motor in the motor housing 4. Again by way of example, the gear wheels feed brake fluid of the brake system from a suction connection, provided on the pump housing 6, to a pressure connection. For installing the gear wheels in the pump housing 6, the pump housing 6 is split into the two pump housing parts 11 and 12. Once the gear wheels have been installed in the pump housing 6, the two pump housing parts 11 and 12 are put together. A guide 14 is provided so that the two pump housing parts 11 and 12 cannot be shifted relative to one another unintentionally.

In the preferred exemplary embodiment selected, the pump in the pump housing 6 and the electric motor in the motor housing 4 form a pumping unit of a hydraulic, slip-controlled brake system of a motor vehicle; the pumping unit serves for instance to return brake fluid from the wheel brake cylinders to the master cylinder of the brake system. The gear wheels of the pump are located essentially in the pump housing part 11, and the second pump housing part 12 substantially serves as a cover of the installation space for the gear wheels. Also located in the second pump housing part 12 by way of example are a bearing and a shaft, supported in this bearing, for transmitting the torque from the electric motor in the motor housing 4 to the gear wheels of the pump in the pump housing 6. For the sake of simplicity, the gear wheels, the shaft, and the aforementioned bearing are not shown in the drawing. It should also be noted that the pump in the pump housing 6 may for instance also be a piston pump, preferably a radial piston pump, which is driven by the electric motor provided in the motor housing 4.

The electric motor is located inside the motor housing 4 embodied as a hollow body. The motor housing 4 is cylindrical and has one face end 16 remote from the pump housing 6 and one face end 18 toward the pump housing 6. The motor housing 4 is cup-shaped and is open in the direction toward the pump housing 6. The motor housing 4 preferably comprises deep-drawn sheet steel with a relatively thin wall 5. A seal, not shown for the sake of simplicity, provides for sealing between the face end 18 of the motor housing 4 and the pump housing 6, so that dirt from the environment cannot get into the interior of the motor housing 4.

A screw opening 20 leads through the substantially cylindrical motor housing 4. The screw opening 20 pierces the wall 5 of the motor housing 4 on the face end 16. A bearing face 22 is provided on the outside of the face end 16 of the motor housing 4. The bearing face 22 extends annularly around the screw opening 20. Parallel to the screw opening 20, a second screw opening 20' pierces the wall 5 of the motor housing 4. The second pump housing part 12 is likewise approximately cylindrical and has a face end toward the motor housing 4 and another face end toward the first pump housing part 11. A through opening 24 leads through the pump housing part 12 from one face end to the other face end. Parallel to it, a second through opening 24' is provided in the second pump housing part 12 and likewise connects the two face ends of the pump housing part 12. The first pump housing part 11 likewise has a substantially cylindrical shape, in approximate terms, with a face end 26 toward the second pump housing part 11. A blind bore leads from the face end 26 into the pump housing part 11. A nut thread 28 is cut into this blind bore. Parallel to the nut thread 28, a second blind bore with a second nut thread 28' is provided, beginning at the face end 26. Once the two pump housing parts 11, 12 and the motor housing 4 with the electric motor have been properly put together, then the screw opening 20, the through opening 24 and the nut thread 28 are all located in a row; the screw opening 20', the through opening 24' and the nut thread 28' are then also all in a row. A further fastening screw 10' is provided in the screw opening 20'. The further fastening screw 10' is designed identically to the first fastening screw 10 and is installed in the same way.

The fastening screw 10 has one region called the screw shaft 10b and another region hereinafter called the screw head 10c. The screw shaft 10b has a screw thread 10a. In the exemplary embodiment shown, the screw thread 10a is provided only on the end of the screw shaft 10b remote from the screw head 10c. However, the fastening screw 10 may also be embodied such that the screw thread 10a extends over the entire screw shaft 10b into the region of the screw head 10c.

Figure 2:
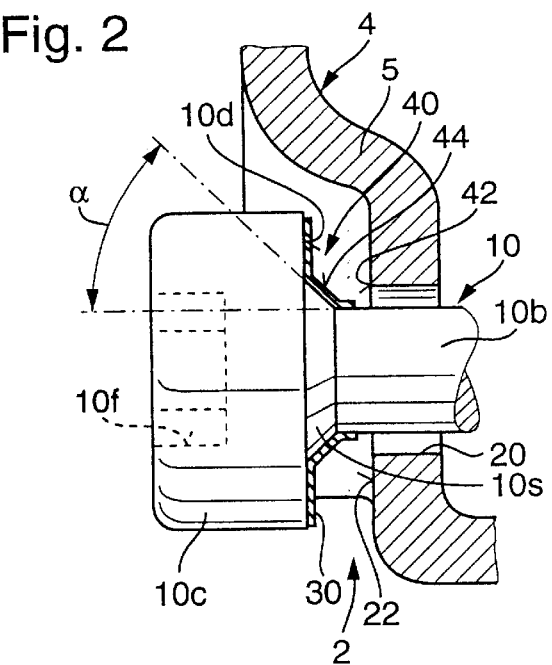
FIGS. 2–4 show various details of the screw connection and the fastening screw.
Figure 3:
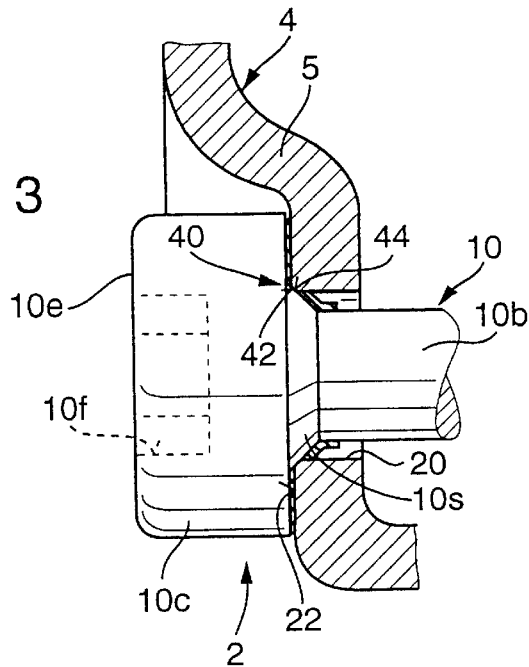

For the sake of simplicity, FIGS. 2 and 3 show the region of the screw connection 2 having the screw head 10c, the bearing face 22, and the screw opening 20 on a different scale.

In all the drawing figures, elements that are the same or function the same are provided with the same reference numerals. Unless otherwise noted or otherwise shown in the drawing, what is described and shown for one of the drawing figures applies to the other exemplary embodiments as well. Unless otherwise stated in the description, the details of the various exemplary embodiments can be combined with one another.

FIG. 2 shows the screw connection 2 before the fastening screw 10 is tightened.

FIG. 3 shows the screw connection 2 after the fastening screw 10 has been properly tightened.

In the region of the transition from the screw shaft 10b to the screw head 10c, there is a shoulder, inclined substantially by 90° relative to the screw shaft 10b, thus creating a retaining face 10d, oriented toward the bearing face 22, on the screw head 10c. The screw head 10c is substantially cylindrical. Beginning at a face end 10e of the screw head 10c remote from the screw shaft 10b, an indentation extends into the screw head 10c. The indentation is not round. By way of example, the indentation has a screw hexagonal cross section and therefore forms a rotational slaving means 10f, which can be engaged by a torque wrench, for instance, for rotating and tightening the fastening screw 10.

The screw shaft 10b with the screw thread 10a protrudes through the screw opening 20 and the through opening 24, and the screw thread 10a is screwed into the nut thread 28 of the pump housing 6. The length of the fastening screw 10 is dimensioned such that in the screwed-in, tightened state the retaining face 10d of the fastening screw 10 presses against the bearing face 22 of the motor housing 4 and clamps the motor housing 4, having the electric motor provided in the motor housing 4, against the pump housing 6. The exemplary embodiment shown is designed such that the fastening screw 10 also clamps and fixes the pump housing part 12 between the motor housing 4 and the first pump housing part 11. The fastening screw 10 holds the electric motor in the motor housing 4, the first pump housing part 11, and the second pump housing part 12 together. The second fastening screw 10' is dimensioned and installed in the same way as the first fastening screw 10.

In the region between the screw shaft 10b and the retaining face 10d on the screw head 10c, there is a bevel 10s. The bevel 10s is located at the place where the screw shaft 10b changes into the screw head 10c. The bevel 10s is inclined by an angle α (alpha) relative to the screw shaft 10b. The angle α amounts to approximately 30° or 60°, for instance, or to some value between 30° and 60°. Experiments have shown that the desired result is best if the angle α is approximately 45°, as is shown in FIG. 2.

A coating 30 is applied to the bevel 10s. As FIG. 2 shows, the coating 30 covers the entire surface of the entire bevel 10s and protrudes beyond the bevel 10s into the region of the retaining face 10d and somewhat into the region of the screw shaft 10b.

The fastening screw 10 comprises high-grade steel, in the usual way, and this means that the basic material comprising the fastening screw 10 is a relatively hard, tough material. The coating 30 is rubber or a plastic, in particular nylon, and the material of the coating 30 is therefore relatively easy to deform. The material of the coating 30 is substantially softer than the basic material of the fastening screw 10. The material of the coating 30 is also substantially softer than the material of the motor housing 4. The material of the body to be held, that is, of the motor housing 4, is a light metal, for instance.

The screw opening 20 passes through the wall 5 of the motor housing 4. To prevent any interfering medium between the screw head 10c and the bearing face 22, or between the screw shaft 10b and the screw opening 20, from getting into the interior of the motor housing 4 from the surrounding environment or from the interior of the motor housing 4 to the outside, a seal 40 is provided. The aforementioned interfering medium is for instance dirt particles, but in particular a liquid such as water, or a gas, such as moisture from the air. The seal 40 is formed by the interplay of a housing sealing location 42 provided on the motor housing 4 and a screw sealing location 44 provided on the fastening screw 10.

In the preferred exemplary selected, there is an encompassing edge (FIG. 2) at the transition between the screw opening 20 and the bearing face 22. Instead of the edge, an encompassing slight bevel or an encompassing slight rounding or an encompassing narrow chamfer may be provided at the transition. The transition between the screw opening 20 and the bearing face 22 forms the housing sealing location 42. It is best if the housing sealing location 42 is a relatively sharp edge, as is shown in FIG. 2.

While the fastening screw 10 is being screwed into the nut thread 28 (FIG. 1), the coating 30 applied to the bevel 10s first comes into contact with the housing sealing location 42, preferably provided in the form of an encompassing edge on the motor housing 4. As the fastening screw 10 is screwed further into the nut thread 28, the housing sealing location 42 presses into the coating 30 and forces the coating 30 to the side, until the housing sealing location 42 comes to rest on the bevel 10s (FIG. 3). The digging in of the housing sealing location 42 creates the screw sealing location 44 of the seal 40 on the fastening screw 10. As FIG. 3 shows, in the region of the bevel 10s there is a direct contact between the material of the motor housing 4 and the basic material of the fastening screw 10. Since in the preferred exemplary embodiment selected, the fastening screw 10 and the motor housing 4 are of metal, there is a metal to metal contact at the seal 40 between the fastening screw 10 and the motor housing 4. The coating 30 is so soft that where the housing sealing location 42 and the screw sealing location 44 touch one another, the coating 30 is locally forced all the way to the side.

The bevel 10s of the fastening screw 10 is adapted to the diameter of the screw opening 20 in such a way that when the fastening screw 10 is tightened the encompassing edge (FIG. 2) at the transition between the bearing face 22 and the screw opening 20 is plastically deformed, so that the edge, which is relatively sharp before the fastening screw 10 is tightened, is pressed somewhat flat (FIG. 3). Since the material of the motor housing 4 is harder than the coating 30, the housing sealing location 42 digs into the coating 30, and since the material of the motor housing 4 is somewhat softer than the basic material of the fastening screw 10, the housing sealing location 42 is pressed somewhat flat as the fastening screw 10 is tightened. No particular effort is involved in making the screw opening 20, because even if the screw opening 20 is relatively markedly nonround and the bearing face 22 is relatively significantly uneven, the full effect of the seal 40 is assured. Pressing the housing sealing location 42 flat causes the housing sealing location 42 to optimally conform to the fastening screw 10. As a result, even with relatively major nonroundness of the screw opening 20 and relatively major unevenness of the bearing face 22, a metal to metal contact between the fastening screw 10 and the motor housing 4 is obtained over the entire circumference of the bevel 10s. If the screw opening 20 is even more nonround and/or the bearing face 22 is even more uneven, then even though the metal to metal contact between the housing sealing location 42 and the screw sealing location 44 is not always obtained over the entire circumference, nevertheless no leak occurs in those regions of the circumference where this contact is not achieved, because this possible gap is completely filled by the coating 30.

As a result of the plastic deformation of the housing sealing location 42, even relatively great errors in the diameter and roundness of the screw opening 20 and in the evenness of the bearing face 22 can easily be compensated for.

Because of the metal to metal contact in the region of the seal 40, the coating 30 cannot impair the action of the fastening screw 10 that clamps the motor housing 4 against the pump housing 6. The prestressing in the screw shaft 10b of the tightened fastening screw 10 is durably preserved despite the soft coating 30. In the proposed screw connection 2, there is excellent sealing between the screw head 10c and the motor housing 4, and nevertheless no seal is required that by its possible settling or other damage could cause a loss of prestressing in the screw shaft 10b of the tightened fastening screw 10.

In the exemplary embodiment shown, the coating 30 also extends more or less far into the region of the retaining face 10d provided on the screw head 10c. When the fastening screw 10 is tightened, the housing sealing location 42, provided in the form of an encompassing edge on the motor housing 4, first presses into the coating 30. As the fastening screw 10 continues to be tightened further, the coating 30 provided on the retaining face 10d comes to rest on the bearing face 22 of the motor housing 4. As the fastening screw 10 is tightened still further, the coating 30 is squeezed more or less out of the region between the retaining face 10d and the bearing face 22, until the fastening screw 10 has been tightened with the intended or predetermined tightening torque.

The fastening screw 10 may also be modified in such a way that the coating 30 is applied only in the region of the bevel 10s. It is not absolutely necessary to apply the coating 30 over the entire bevel 10s; it suffices to apply the coating 30 only in the region of the bevel 10s where the contact between the housing sealing location 42 and the screw sealing location 44 takes place.

Figure 4:
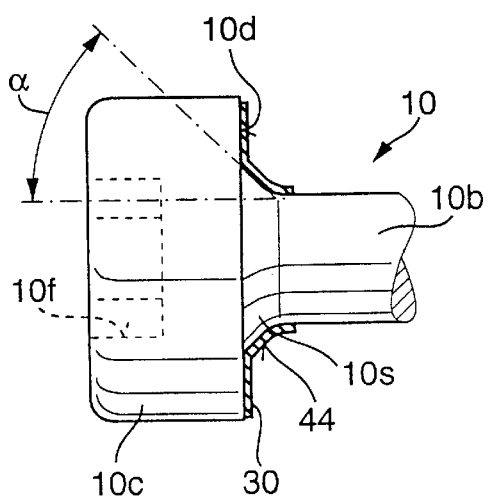

FIG. 4 by way of example shows a modification of the fastening screw 10.

Since it is favorable, for the sake of long-term vibration resistance of the fastening screw 10, for the transition from the screw shaft 10b to the screw head 10c not to be abrupt, the fastening screw 10 shown in FIG. 4 has been modified in such a way that the transition from the bevel 10s to the screw shaft 10b is not done abruptly with an edge; instead, in this version, the transition from the bevel 10s to the screw shaft 10b is rounded, with a relatively large radius. This has advantages, especially if the fastening screw, as a so-called expansion screw, is subject to heavy vibrational loads.

Even if the transition from the screw shaft 10b to the bevel 10s is effected by rounding, the fastening screw 10 is still embodied such that in the region of the screw sealing location 44, that is, where the bevel 10s comes into contact with the housing sealing location 42 provided on the motor housing 4, the bevel; 10s is inclined in such a way that the angle $\alpha$ is between approximately 30° and 60°, and preferably 45°. To obtain a durable connection between the motor housing 4 and the pump housing 6 as well as good sealing action between the fastening screw 10 and the motor housing 4, the following procedure is proposed for screwing in the fastening screw 10: Once the bodies to be screwed together have been put together, that is, once the motor housing 4 has been placed against the pump housing 6, the screw shaft 10b of the fastening screw 10 is inserted through the screw opening 20, and the screw thread 10a is screwed into the nut thread 28 as soon as the fastening screw 10 has been screwed into the nut thread 28 far enough that the bevel 10s of the fastening screw 10 comes to rest at the housing sealing location 42 of the motor housing 4, the prestressing force rises, with reference to the distance to which the fastening screw 10 is screwed into the pump housing 6, initially only relatively slightly as the fastening screw 10 continues to be screwed into the nut thread 28. The prestressing force is the force by which the fastening screw 10 keeps the motor housing 4 pressed against the pump housing 6. The prestressing force acts as mechanical prestressing in the screw shaft 10b as well. With reference to the distance by which the fastening screw 10 is screwed in, the prestressing force therefore initially rises only slightly, since the coating 30 is easily deformed and since when the fastening screw 10 is being screwed into the pump housing 6 the housing sealing location 42, which has preferably been made in the form of a sharp edge on the motor housing 4, deforms plastically. Upon further screwing of the fastening screw 10 into the nut thread 28, the state is finally attained in which the aforementioned metal to metal contact between the fastening screw 10 and the motor housing 4 is established, and in which the housing sealing location 42 on the motor housing 4 has reached a width at which the housing sealing location 42 undergoes hardly further plastic deformation.

It is proposed that after first being screwed in, the fastening screw 10 is then unscrewed out of the nut thread 28 again far enough that the prestressing force in the screw shaft 10b is undone at least partly, but preferably completely. To that end, the fastening screw 10 need merely be unscrewed by a few turns, since the plastic deformation of the coating 30 and of the motor housing 4 that occurring during the first screwing in are preserved. Next, the fastening screw 10 is tightened once again. To that end, the fastening screw 10 need merely be screwed into the nut thread 28 by a few turns, because no further plastic deformation or as good as no further plastic deformation will occur.

The number of turns of the fastening screw 10 required is substantially less, for loosening and retightening the fastening screw 10, than that required when the screw was initially screwed in.

The next time it is screwed in, the fastening screw 10 is tightened until the prestressing force in the screw shaft 10b has reached the intended value. The intended value for the prestressing force is calculated substantially from the diameter of the screw shaft 10b and from the allowable mechanical prestressing in the screw shaft 10b. The allowable mechanical prestressing depends on the basic material used for the screw shaft 10b, and the diameter of the screw shaft 10b is in turn adapted to the motor housing 4 in such a way that when the fastening screw 10 has been properly tightened, the motor housing 4 will not warp excessively.

The prestressing forces in the screw shaft 10b, the first time the fastening screw 10 is tightened and the second time it is tightened can be attained in a simple way as follows: First, the fastening screw 10 is tightened using the first torque. Then the fastening screw 10 is loosened again until the torque has dropped somewhat, preferably until the torque has dropped to zero. After that, the fastening screw 10 is tightened again up to a tightening torque that is defined such that the prestressing force in the screw shaft 10b reaches the intended value. By tightening the fastening screw 10 a second time and loosening it in between, it is attained that any settling phenomena and plastic deformation cannot have any negative impact on the durability of the connection created by means of the fastening screw 10. In particular it is thus attained that even over relatively long use, and particularly when there is vibrational stress on the connection, the prestressing force in the screw shaft 10b will not drop, or will not drop far enough that loosening or separation of the fastening screw 10 would have to be feared.

To attain the best possible effect as a result of tightening the fastening screw 10 twice, it is proposed that the first torque, up to which the fastening screw 10 is tightened the first time it is screwed in, is selected to be equal in magnitude to the planned or predetermined or specified tightening torque by which the fastening screw 10 is finally tightened.

Since the first time the fastening screw 10 is screwed in considerable plastic deformation occurs in the region of the seal 40, it is not necessarily assured that the torque with which the fastening screw 10 is screwed in will be converted directly into prestressing force the first time it is screwed in. By means of the repeated tightening of the fastening screw 10 with the at least partial loosening in between, this possible uncertainty is overcome entirely, and a secure, durably tight screw connection that is resistant to long-term vibration is achieved.

The foregoing relates to preferred exemplary embodiments of the invention, it being understood that other variants and embodiments thereof are possible within the spirit and scope of the invention, the latter being defined by the appended claims.

The invention claimed and desired to be secured by Letters Patent of the United States is:

1. A screw connection (2) having a body (4), a base body (6) including at least one screw threaded bore (28), and a fastening screw (10) with a screw shaft (10b), a screw head (10c) and a screw thread (10a) on an end portion of the screw shaft (10b), wherein the screw shaft (10b) protrudes through a screw opening (20) provided in the body (4), a bevel (10s) is between the screw head (10c) and the screw shaft (10b), said bevel (10s) has been provided at least partially with a deformable coating (30) thereon, the screw thread (10a) is screwed into the at least one threaded bore (28) of the base body (6) until the bevel (10s) of the fastening screw (10) is braced against the body (4) and holds the base body (6) against the body (4), after threading the screw thread (10a) into the at least one threaded bore (28), the bevel (10s) rests on the body (4) and the coating (30) rests on a portion of the body (4);

a body sealing location (42) is provided on the body (4);

the body sealing location (42) forms a circumference, and the circumference surrounds the screw opening (20);

the body sealing location (42) presses, along its entire circumference, into the coating (30) provided on the bevel (10s); and the circumference of the body sealing location (42) positively displaces portions of the coating (30) until at least a portion of the circumference of the body sealing location (42) contacts the bevel (10s) to provide a direct surface-to-surface contact.

2. A screw connection in accordance with claim 1, in which the coating (30) comprises a material that is substantially softer than a basic material of the fastening screw (10).

3. A screw connection in accordance with claim 1, in which the bevel (10s) is inclined by approximately 30° to 60° relative to the screw shaft (10b).

4. A screw connection in accordance with claim 3, in which the bevel (10s) is inclined by approximately 45° relative to the screw shaft (10b).

5. A screw connection in accordance with claim 1, in combination with a body in which said retaining face (10d) is provided on the screw head (10c), said retaining face is oriented toward the body (4) and is aligned substantially by 90° relative to the screw shaft (10b).

6. A screw connection in accordance with claim 5, in which the retaining face (10d) rests on a bearing face (22) provided on the body (4).

7. A screw connection in accordance with claim 5, in which the retaining face (10d) is at least partly provided with the coating (30).

8. A screw connection in accordance with claim 7, in which the coating (30) rests on a bearing face (22) provided on the body (4).

9. A screw connection as set forth in claim 1 in which said retaining face (10d) includes a coating (30) thereon, and subsequent to screwing said threaded shaft into said screw threaded bore said coating on said retaining face is secured between said screw head and said body (4).

* * * * *